Feb. 28, 1933.  H. E. FRITZ  1,899,413
ACID VAT
Filed March 17, 1931
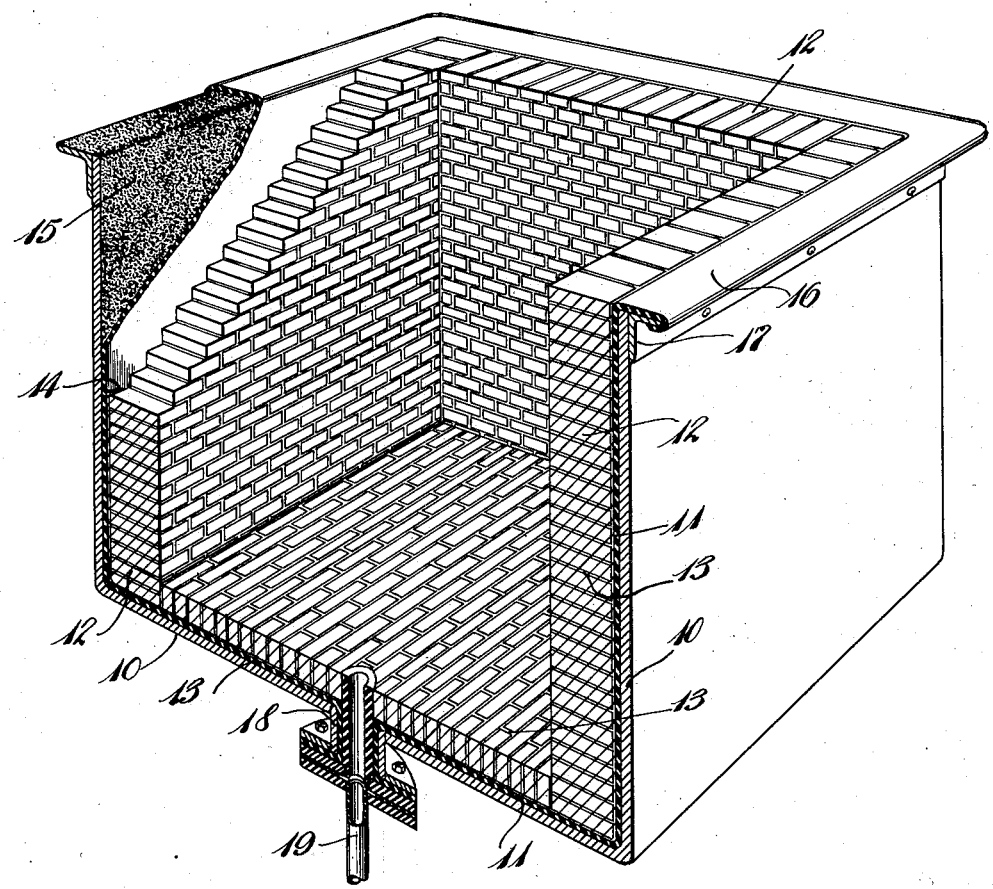
Inventor
Howard E. Fritz
By Eakin & Avery
Attys Patented Feb. 28, 1933

1,899,413

UNITED STATES PATENT OFFICE

HOWARD E. FRITZ, OF AKRON, OHIO, ASSIGNOR TO THE B. F. GOODRICH COMPANY, OF NEW YORK, N. Y., A CORPORATION OF NEW YORK

ACID VAT

Application filed March 17, 1931. Serial No. 523,281.

This invention relates to acid vats or tanks such as are employed for the acid treatment or "pickling" of metal articles at elevated temperatures, wherein a lining of bricks set in acid proof cement is employed within an impervious metal tank for retaining the heat in the acid bath and to prevent damage to the metal walls of the tank by contact of the metal articles therewith.

Heretofore the impervious metal tank has consisted of a steel shell and a facing of lead on its inner surface, between the steel shell and the brick lining, the brick lining being somewhat pervious to the acid and the lead facing serving to prevent contact of the acid with the steel shell, but the lead facings have been expensive, have afforded inadequate cushioning properties, have been subject to rupture upon rupture of the brick lining, and have been rather expensive to repair or replace.

The object of my invention is to provide an inexpensive vat or tank of the character referred to; to provide improved cushioning of the structure against the shock of heavy metal objects falling upon the floor or otherwise violently contacting the lining of the tank; to avoid extensive contact of the acid with the metal shell in case of local rupture of its facing; and to provide for economical repair of the structure.

I find that the heat insulating effect of the brick lining, although the porous brick is permeated by the acid, provides a sufficient temperature drop from the inner face to the outer face of the brick lining that a rubber facing for the steel shell may be employed without excessive deterioration of the rubber resulting from the heat, and that the rubber facing provides the advantages set out in the above statement of objects.

The single figure of the accompanying drawing is a perspective view, with a portion sectioned and removed, of an acid vat or tank embodying my invention in its preferred form.

Referring to the drawing, the vat comprises a steel shell 10 provided with an inner facing 11 of rubber, which may be soft or semi-hard, according to the character of the acid to be employed, or may even be of hard rubber, without sacrifice of all of the above-mentioned advantages. Alternatively, the rubber facing may consist of a layer of hard rubber next to the steel shell, for strong adhesion, and a cushion layer of soft rubber adhered to it, or it may consist of a cushion layer of soft rubber next to the steel shell and, vulcanized thereto, an acid contacting layer of semi-hard or hard rubber for high resistance to particular acids.

The brick lining within the rubber facing 11 consists of bricks 12, 12 set in acid proof cement 13, which preferably is extended in a continuous layer over the outer face of the assembly of bricks, as indicated 14, the facing of cement on the bricks contacting the rubber facing 11.

The rubber facing preferably is adhered to the steel shell by means of a suitable rubber-to-metal adhesive 15, and the rubber facing preferably is extended, as shown at 16, over the upper edge face of the metal shell and that of the reinforcing member 17 secured to the shell, and downwardly over the laterally projecting margin of the latter, to protect the shell and the reinforcing member against acid splashed from the tank.

At the drain outlet of the tank the rubber facing is continued through the metal outlet conduit 18 and has acid proof connection with a hard rubber acid pipe 19 leading from the outlet of the tank.

The vat is preferably constructed by first vulcanizing the rubber facing 11 in place in the steel shell 10 and thereby adhering it to the latter by means of the adhesive 15 and thereafter building the brick lining within the rubber lined tank, or the vulcanization of the rubber may be effected by the heat to which it is subjected in the use of the vat, but the heat reaching the rubber facing through the brick wall is not such as to destroy the impermeability of the rubber facing in long periods of use.

Because of the yielding and resilient character of the rubber, a considerable cushioning effect against blows is provided, and even in case of local rupture of the rubber facing the adhesion of the facing to the metal shell prevents extensive contact of the acid with the shell and the resilience of the rubber prevents flow or diffusion of the acid to the metal except by a very slow seepage and slight fractures of the rubber may be sealed by swelling of the rubber or the corroded material.

I claim:

1. An acid vat comprising a metal shell and brick lining and a layer of rubber between the two, the rubber layer being adhered to the metal shell substantially throughout its extent.

2. A container adapted to hold acid at high temperatures, said container comprising a rigid supporting structure, a layer of rubber extending over the inner walls thereof in adhesive engagement therewith and capable of resisting the action of acid at low temperatures, and a protective layer of acid resisting brick extending over the rubber layer and adapted to insulate the rubber layer against high temperatures.

3. A container adapted to hold acid at high temperatures, said container comprising a rigid supporting structure of heat-conductive metal, a layer of rubber extending over the inner walls thereof and capable of resisting the action of acid at low temperatures and a protective layer of acid resisting brick extending over the rubber layer and adapted to insulate the rubber layer against high temperatures, said rubber layer being adhesively attached to said supporting structure.

4. A container adapted to hold acid at high temperatures, said container comprising an outer wall having high heat conductivity, an acid-resisting masonry inner lining having low heat conductivity, and a layer of resilient rubber material adapted to resist acid at low tempertures located therebetween and adhesively attached to said outer wall.

In witness whereof I have hereunto set my hand this 11th day of March, 1931.

HOWARD E. FRITZ.